US010469589B2

(12) United States Patent
Mueller et al.

(10) Patent No.: US 10,469,589 B2
(45) Date of Patent: *Nov. 5, 2019

(54) VEHICLE CABIN MOBILE DEVICE SENSOR SYSTEM

(71) Applicant: FORD GLOBAL TECHNOLOGIES, LLC, Dearborn, MI (US)

(72) Inventors: Paul Mueller, St Clair Shores, MI (US); Gregory Farrey, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,962

(22) Filed: Nov. 14, 2017

(65) Prior Publication Data

US 2019/0149612 A1 May 16, 2019

(51) Int. Cl.
*H04W 4/02* (2018.01)
*H01Q 1/32* (2006.01)
(Continued)

(52) U.S. Cl.
CPC ............ *H04L 67/125* (2013.01); *B60N 2/002* (2013.01); *B60N 2/0244* (2013.01); *H01Q 1/3275* (2013.01); *H01Q 13/20* (2013.01); *H04W 4/023* (2013.01); *H04W 4/026* (2013.01); *B60N 2002/0272* (2013.01)

(58) Field of Classification Search
CPC .............. H01Q 1/3275; H01Q 1/3291; B60N 2002/0268; B60N 2002/0272; B60N 2002/0248; H04W 4/026
See application file for complete search history.

(56) References Cited

U.S. PATENT DOCUMENTS 5,414,394 A 5/1995 Gamand et al.
5,532,709 A 7/1996 Talty
(Continued)

FOREIGN PATENT DOCUMENTS

KR 20000074382 A 12/2000
WO 2006070168 A1 7/2006
WO 2007135488 A1 11/2007

*Primary Examiner* — Asghar H Bilgrami
(74) *Attorney, Agent, or Firm* — Michael J. Spenner; Brooks Kushman P.C.

(57) ABSTRACT

A vehicle includes at least one and/or one or more in-vehicle and/or onboard controller(s) that is/are coupled to spaced apart sensor groups that are arrayed within a headliner and/or seats of the vehicle cabin. Each sensor group generally corresponds to and/or with a plurality of and/or one or more seat positions, each having a single seat, and which include a driver zone seat position that has a driver seat. Each sensor group in the array includes at least one signal processor, and a plurality of transceivers, antennas, and/or sensors configured for and tuned to different electromagnetic frequencies and/or powers. Also included are electromagnetically active, directional waveguides that adjust, amplify, and/or attenuate the sensitivity of each of the respective antennas, to electromagnetic energy detected and received from mobile devices located in the vehicle cabin, such that the sensitivity is limited to electromagnetic emissions within a limited effective range for each antenna.

19 Claims, 2 Drawing Sheets

(51) Int. Cl.
  *H01Q 13/20* (2006.01)
  *B60N 2/02* (2006.01)
  *H04L 29/08* (2006.01)
  *B60N 2/00* (2006.01)

(56) References Cited

U.S. PATENT DOCUMENTS

| | | | |
|---|---|---|---|
| 5,583,510 A | 12/1996 | Ponnapalli et al. | |
| 5,717,411 A | 2/1998 | Knop et al. | |
| 5,764,116 A | 6/1998 | Ishikawa et al. | |
| 5,777,583 A | 7/1998 | Canora et al. | |
| 5,867,131 A | 2/1999 | Camp, Jr. et al. | |
| 5,898,404 A | 4/1999 | Jou | |
| 5,898,405 A | 4/1999 | Iwasaki | |
| 5,943,017 A | 8/1999 | Cosenza et al. | |
| 5,945,894 A | 8/1999 | Ishikawa et al. | |
| 5,990,838 A | 11/1999 | Burns et al. | |
| 6,005,519 A | 12/1999 | Burns | |
| 6,025,811 A | 2/2000 | Canora et al. | |
| 6,044,192 A | 3/2000 | Grant et al. | |
| 6,052,096 A | 4/2000 | Tsuru et al. | |
| 6,054,955 A | 4/2000 | Schlegel, Jr. et al. | |
| 6,262,657 B1 | 7/2001 | Okuda et al. | |
| 6,420,975 B1 * | 7/2002 | DeLine | B60R 1/12 340/425.5 |
| 6,794,728 B1 | 9/2004 | Kithil | |
| 7,474,264 B2 | 1/2009 | Bolduc et al. | |
| 7,646,312 B2 | 1/2010 | Rosen | |
| 8,836,491 B2 | 9/2014 | Rao et al. | |
| 9,008,641 B2 | 4/2015 | Yang et al. | |
| 9,042,872 B1 | 5/2015 | Breed et al. | |
| 9,124,703 B2 | 9/2015 | Tadayon et al. | |
| 9,211,811 B2 | 12/2015 | Breed | |
| 9,224,289 B2 | 12/2015 | Demeniuk et al. | |
| 9,349,231 B2 | 5/2016 | Hatton | |
| 9,369,830 B2 | 6/2016 | Nelson et al. | |
| 9,516,492 B2 | 12/2016 | Miller et al. | |
| 9,580,044 B2 | 2/2017 | Van Wiemeersch et al. | |
| 9,608,952 B2 | 3/2017 | Wan et al. | |
| 9,612,797 B2 | 4/2017 | Cuddihy et al. | |
| 9,615,213 B2 | 4/2017 | Tibbitts et al. | |
| 9,661,127 B1 * | 5/2017 | Singh | H04W 4/029 |
| 9,725,071 B2 | 8/2017 | Miller | |
| 9,827,875 B2 * | 11/2017 | Wang | B60N 2/0244 |
| 2007/0229234 A1 | 10/2007 | Smith | |
| 2010/0197359 A1 | 8/2010 | Harris | |
| 2011/0080274 A1 | 4/2011 | Reed et al. | |
| 2011/0105097 A1 | 5/2011 | Tadayon et al. | |
| 2011/0183601 A1 | 7/2011 | Hannon | |
| 2011/0207448 A1 | 8/2011 | Chen et al. | |
| 2011/0219080 A1 | 9/2011 | McWithey et al. | |
| 2011/0237186 A1 * | 9/2011 | Preissinger | B60R 16/037 455/41.1 |
| 2011/0300843 A1 | 12/2011 | Miller et al. | |
| 2012/0006611 A1 * | 1/2012 | Wallace | H04M 1/67 180/272 |
| 2012/0040665 A1 * | 2/2012 | Liu | H04W 4/80 455/426.1 |
| 2012/0299344 A1 * | 11/2012 | Breed | B60J 10/00 297/217.1 |
| 2013/0154298 A1 * | 6/2013 | Ricci | B60R 11/0229 296/37.12 |
| 2014/0109080 A1 * | 4/2014 | Ricci | G06F 8/61 717/174 |
| 2014/0306833 A1 * | 10/2014 | Ricci | B60Q 1/00 340/901 |
| 2015/0382156 A1 | 12/2015 | Gruteser et al. | |
| 2016/0129916 A1 * | 5/2016 | Olsen | B60W 40/08 701/36 |
| 2016/0280098 A1 * | 9/2016 | Frye | B60N 2/0228 |
| 2018/0035433 A1 * | 2/2018 | Zielinski | H04B 17/102 |

* cited by examiner

VEHICLE CABIN MOBILE DEVICE SENSOR SYSTEM

TECHNICAL FIELD

The disclosure relates to a mobile device detection and location system for passenger cabins of a vehicle, which enables a vehicle infotainment system to monitor radio frequency emissions and identify locations of mobile devices located within the cabin.

BACKGROUND

Vehicle manufacturers have developed various types of in-vehicle and/or on-board computer processing systems that include vehicle control, mobile and nomadic device communications systems, related messaging and control capabilities, and various other vehicle related applications. Additionally, such vehicle systems sometimes are further configured to enable automated vehicle features, and secure pairing and communications with such mobile and nomadic devices when located inside the vehicle. One such automated capability includes, for example, detecting a mobile or nomadic device that is configured to operate as a key and/or key fob for the vehicle, when such a key or key fob is detected to be within an effective range of a driver seat position.

Such key-fob-enabled mobile and/or nomadic devices have typically been configured as Bluetooth low energy (BLE) devices that must be within a predetermined range of a transceiver in the vehicle to enable such operations. While some advances have been made to detect locations of such mobile and nomadic devices within a cabin of the vehicle, limitations persist that prevent consistent and accurate location detection capabilities, and opportunities for improvements persist.

SUMMARY

Many types of personal, commercial, and industrial vehicles, including combustion engine and hybrid, plug-in hybrid, and battery electric vehicles, hereafter collectively referred to as "vehicles," include several types of in-vehicle computing systems, controllers, interfaces, networks, communications capabilities, and related applications. Such onboard systems and applications enable vehicle operation, as well as vehicle to mobile and nomadic device communications, and related capabilities that enable detection of such mobile and nomadic devices at precise locations inside the vehicle cabin.

The disclosure is directed to a vehicle that includes at least one and/or one or more in-vehicle and/or onboard controller(s) that is/are coupled to sensor groups spaced apart and arrayed within a cabin of the vehicle. Each sensor group generally corresponds to and/or with a plurality of and/or one or more seat positions that each have respective cabin seats, including a driver zone seat position that has a driver seat.

Each sensor group in the array includes at least one signal and/or digital signal processor (hereafter referred to as DSP or DSPs), and a plurality of antennas configured for and tuned to different electromagnetic frequencies. Each of the respective antennas also include and/or incorporate electromagnetically active, directional waveguides that adjust, amplify, and/or attenuate the sensitivity of each of the respective antennas and their responsiveness to electromagnetic energy received from and emitted by mobile or nomadic devices within the cabin and within a substantially limited effective range (LER) of each antenna.

The directional waveguide(s) may be formed from reflective, absorptive, and combination materials that are configured to adjust the sensitivity and electromagnetic responsiveness of the antennas. Each sensor group includes at least one of such waveguides and may also include one waveguide for each antenna of the sensor group, configured to adjust the capabilities for each antenna of the sensor group. In further variations, each sensor group also includes one or more of such waveguides to correspond to and/or be integrated with each and/or one or more of the antennas of the sensor group. Such waveguides may utilize materials formed and/or configured as band pass filters, polarizers, electromagnetic energy shields, masks, and/or other constructions that limit, adjust, attenuate, augment, and/or amplify antenna sensitivity, impedance, reception power, and/or responsiveness to electromagnetic frequencies and powers emitted by the contemplated mobile and nomadic devices when located inside the cabin.

Each of such configurations adjust the antennas such that mobile and nomadic device electromagnetic emissions may be detected and received by the antennas from within the respective LER of each antenna, and wherein the LER is adjusted by the waveguide(s) to correspond to and/or be super-positioned proximate to respective, single seats and/or seat positions. In these arrangements, the controller(s) are further configured to detect a location and/or seat position and one or more keycode(s) transmitted by and emitted by the one or more nomadic and/or mobile devices located in the cabin, and to generate at least one and/or one or more mobile device and/or vehicle commands responsive to and according to the seat position and/or keycode(s).

The sensor groups and/or antennas of the groups are, in some variations of these arrangements, integrated into a headliner of the cabin, with each sensor group positioned to correspond with a respective seat position and seat proximate the position. At least one waveguide or each sensor group and/or each respective antenna is configured to establish the LER to be substantially limited to each respective seat position for each antenna of each sensor group and/or each sensor group.

In this configuration, the controller(s) alone, and/or in combination with one or more of the signal processor and each sensor group, is/are configured to generate locations, according to the limited effective range of the antennas, of each of the one or more mobile devices, which locations identify, are relative to, and/or are associated to each and/or one specific seat and/or seat position. Such seats and seat positions include the driver zone and the driver seat. In further modifications, the sensor groups and/or antennas thereof are positioned proximate to a seat position in the cabin, and also may be included, integrated, and/or incorporated as part of each seat within each seat position. In this arrangement too, the controller(s), alone and/or in combination with the DSP(s), generates the location of each mobile and/or nomadic device, relative to each proximate seat position and/or integrated seat.

In modifications to such variations, each sensor group includes the at least one and/or or one or more waveguide(s) being configured to establish the LER to be substantially limited to each respective seat position and/or seat for each antenna of each sensor group. As with other adaptations, the controller(s), in combination with the DSP(s), generates each mobile and/or nomadic device location relative to a single one of the respective seat positions and/or seats, and according to the LER. The one or more and/or at least one waveguide(s) and antennas are combined to be and/or are directionally oriented with respect to a corresponding single seat position and/or seat, such that the waveguide(s) establish the LER to be limited to each respective seat position, including the driver zone, and/or each seat, including the driver seat, for each antenna of each sensor group.

Such directionally oriented antennas and waveguide(s) are also configured to cooperate with the controller(s), also in combination with one or more of the DSPs and each sensor group, to generate the respective locations of each of the one or more mobile and/or nomadic devices, relative to each respective seat position and/or seat in the cabin, including the driver zone and seat, and according to the LER of the antennas and/or waveguide(s).

In the contemplated modifications wherein the waveguide(s) and antennas are integrated into the headliner of the cabin, and/or directionally oriented, each sensor group is located and positioned to be above and corresponding to a single seat position and/or seat in the cabin, including the driver zone and seat. The additionally described arrangements are similarly modified and configured when each sensor group is integrated as part of a single seat.

In additional variations, the sensor groups each include one or a respective DSP coupled to each of the different frequency tuned antennas, which antennas each may also include a respective waveguide. Each DSP is coupled to one antenna and integral or integrated waveguide, and the combination is tuned to one of the different frequencies. As with other arrangements, each combined signal processor, antenna, and waveguide, in combination with the controller(s), are also further configured to detect a respective communication protocol being utilized on the one different frequency, by one or more of the mobile and/or nomadic devices.

In other adaptations that include methods of controlling the vehicle and operation of the various configurations and arrangements, the controller(s) and sensors groups, including the DSPs, antennas, and waveguides, are further configured to autonomously generate the vehicle and mobile device commands, in response to the detected and/or generated location and a mobile device keycode. Whether the sensor groups and included components are integrated into the headliner, seats, and/or positioned proximate to the seat positions, the controller(s) are cooperatively are configured for generating the respective locations of each of the mobile devices, relative to each corresponding single seat of the seat positions, and according to the directional orientation of the antennas and waveguides and/or LER.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
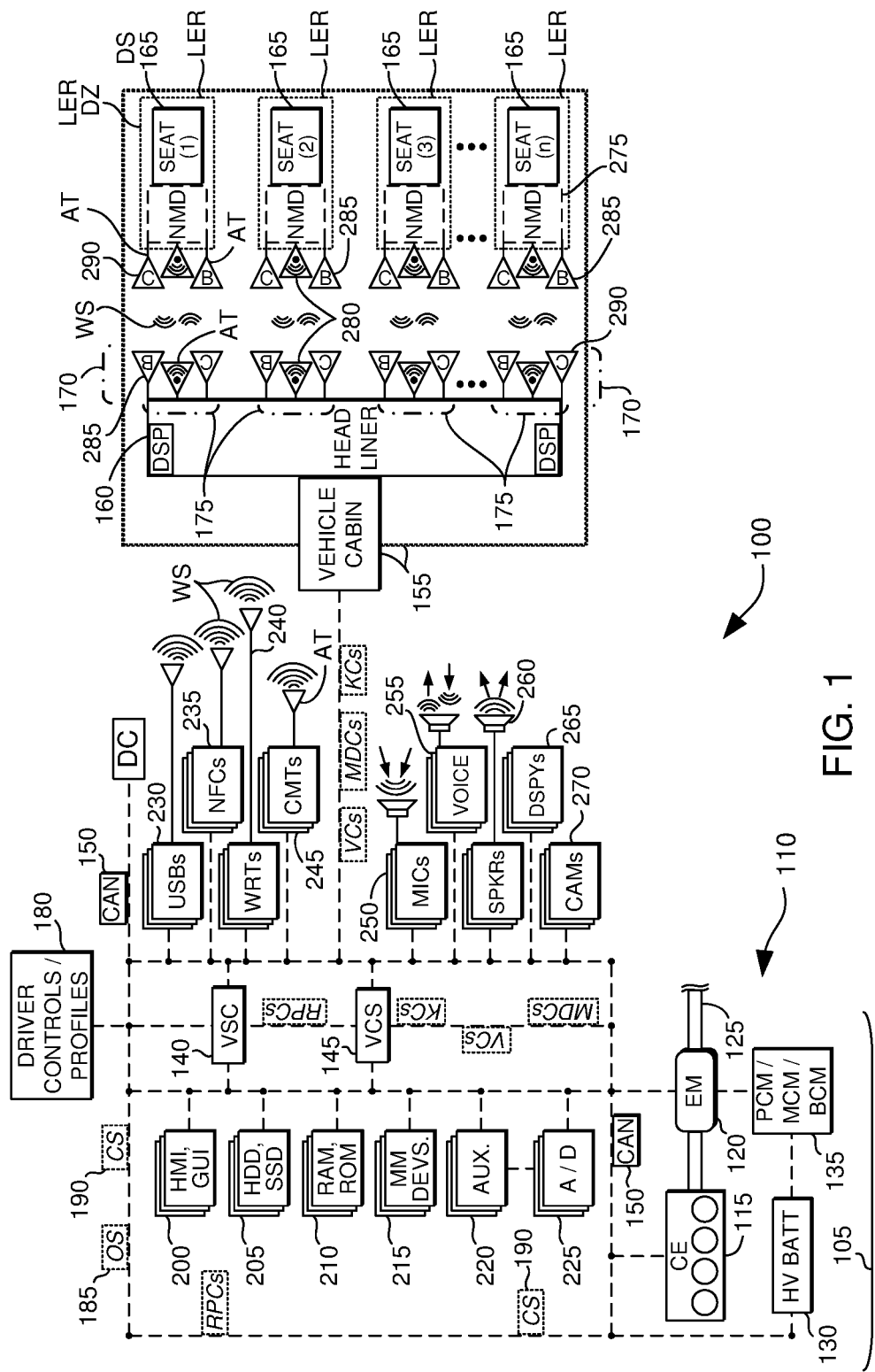
FIG. 1 is an illustration of a vehicle and its systems, controllers, components, sensors, actuators, and methods of operation.
Figure 2:
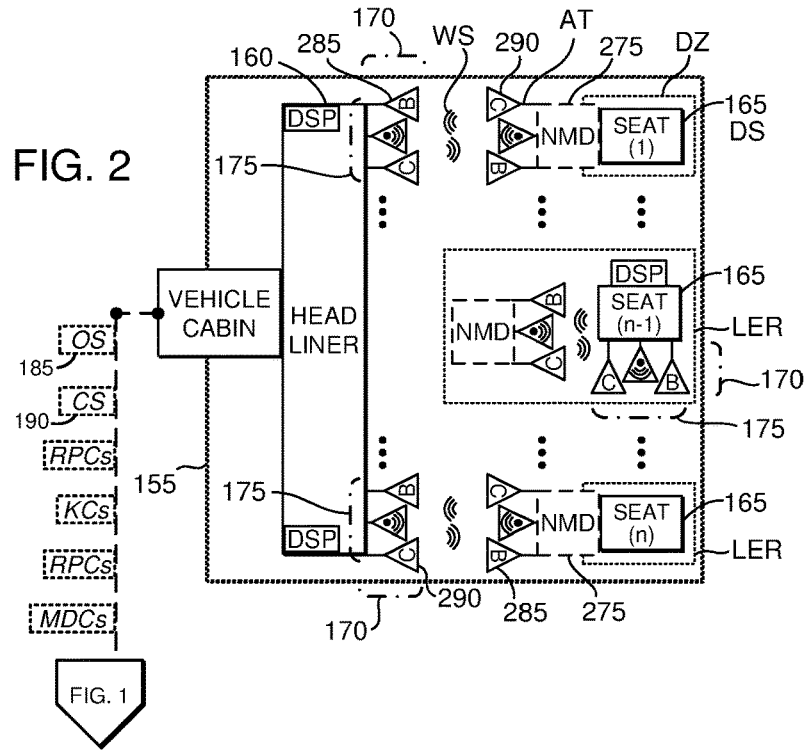
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and/or that may be incorporated as part of a vehicle system controller (VSC) 140 and a vehicle computing system (VCS) and controller 145, which are in communication with PCM/MCM/BCM 135, and other controllers.

For example, in some configurations for purposes of example but not limitation, VSC 140 and/or VCS 145 is and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM. Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink.com, openXCplatform.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC™ AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing in-vehicle or on-board HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUIs, and also may include utilization of on-board or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/430.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), vehicle area networks (VANs), wide area networks (WANs), peer to peer (P2P), vehicle to vehicle (V2V), and vehicle to infrastructure, infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V), and vehicle to roadway infrastructure to vehicle communication system (V2I, I2V), a LIDAR/SONAR (light and/or sound detection and ranging) and/or video camera roadway proximity imaging and obstacle sensor system, a GPS or global positioning system, and a navigation and moving map display and sensor system, among others.

The disclosure is also directed to the controller(s) and processing and computing systems such as VSC 140, VCS 145, and/or others coupled to various additional controller(s), sensors, and devices in a cabin 155 of vehicle 100. Cabin 155 includes a headliner 160, and two to six, or more, driver and passenger seats or seating positions 165, as well as an array 170 of seat position sensor groups 175. As depicted in the various figures, including FIGS. 1, 2, 3, for illustration purposes, seats and/or seat positions 1, 2, 3, through seat number "n" are depicted (a symbolic, vertically oriented, three dot ellipsis represents seats and/or seat positions up to seat number "n").

The disclosure contemplates in another example, two to six, or more seat positions 165. Small two passenger vehicles may have a driver seat (DS) and a single passenger seat, while larger passenger vehicles may have 4 to 6, or more seats or positions. Even larger vehicles such as vans, recreational vehicles, buses, and the like may have even more seats and/or positions 165. Such seats and/or seat positions further define, in additional arrangements, a driver zone (DZ) that is a predetermined, two-dimensional area and/or three-dimensional volumetric region defined and super-positioned about a driver seat position 165, and/or which circumscribes an area and/or volume proximate to the driver seat position 165. With reference to FIGS. 1 and 2, it may be understood that the contemplated driver zone DZ, for purposes of example and additional illustration but not for purposes of limitation, may be two-dimensionally positioned about the seat and/or seat position 165 labeled "1", which for purposes of illustration is designated in this example as the driver seat DS and/or driver zone seat position 165, DZ.

The sensors groups 175 are integrated, incorporated, positioned, and/or arrayed about cabin 155, and in one example are integrated within headliner 160. In another example, the sensor groups 175 are arrayed about, proximate to, within, integral with, incorporated within, and/or beneath each seat and/or seat position 165. Such sensor groups 175 include one or more and/or at least one sensor and/or sensor assembly(ies) that each further include at least one and/or one or more acoustic, capacitive, inductive, and/or radio frequency electromagnetic sensor(s), such as antenna(s) or transceivers (ATs), and/or signal processor(s).

In variations, sensors groups 175 may be arrayed about and integrated within headliner 160, such that one or more and/or at least one sensor group(s) 175 is/are positioned proximate to and above each of the seat positions and seats 165. Additional modifications include at least and/or one or more such sensor groups(s) 175 integrated with each seat and seat position 165. Each such sensor group includes at least one and/or one or more sensors, transceivers, antennas AT, and/or antenna wave guides, each tuned to different frequencies and/or powers such as Bluetooth, BLE, WiFi, and/or cellular frequencies and/or powers, as is described in more detail elsewhere herein.

Such components also may include or incorporate one or more digital signal(s) processor(s) (DSPs), and controller(s) and sensors, which components individually and/or in combination are configured to monitor, receive, detect, and/or respond to various cabin environmental conditions as described elsewhere herein. In further examples, the sensor groups are positioned to each correspond with respective seats and seat positions 165, and in other variations may be arrayed to enable detection of and signal processing of electromagnetic emissions from nomadic and mobile devices (NMDs) 275 in cabin 155, to enable detection and/or generation of locations of NMDs 275 relative to positions of seats and seat positions 165. DSPs are further configured to detect signal strengths of the emissions for different frequencies from NMDs 275 within limited effective ranges (LERs), and to detect and generate locations of the NMDs 275 proximate each single seat position and seat 165, utilizing the DSPs to detect and generate the locations in response to one or more of the signal strengths, detections within LERs, and/or distance and triangulation methods using such signal strengths.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V and V2I/I2V (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

A number of international standards organizations are also involved in the field of technology and have generated various V2X resources such as SAE telematics and related standards J2945 and J2735: "On-Board System Requirements for V2V Safety Communications Standard," SAE J2945/1_201603, available from standards.sae.org/j2945/1_201603/, and "Dedicated Short Range Communications (DSRC) Message Set Dictionary Standard," SAE J2735_201603, available from standards.sae.org/j2735_201603, and others available from topics. sae.org/telematics/standards/automotive.

The SAE J2735 standard describes, defines, and specifies messages and data elements that make up messages/dialogs specifically for use by vehicle, infrastructure, and other off-board applications that utilize 5.9 gigahertz (GHz) DSRC for Wireless Access in Vehicular Environments (WAVE) communications systems. Such WAVE communications and related systems are described in more detail in various standards and reports established by and available from the Institute of Electrical and Electronics Engineers (IEEE) as described below. See, for example, standards. ieee.org, and more specifically, IEEE standard 1609, entitled, "Guide for Wireless Access in Vehicular Environments (WAVE) Architecture," which is available from standards.ieee.org/develop/wg/1609_WG.html.

The IEEE 1609 WAVE standards enable and define an architecture and a standardized set of communications services and interfaces that enable secure V2V and V2I wireless communications. These standards enable a range of transportation and navigation applications, including vehicle safety, automated tolling, enhanced navigation, and traffic management, among others. The IEEE 1609 Wave capabilities are utilized in conjunction with others directed to various aspects of network and communications standards and architectures, including those managed by the IEEE 802 local area network and metropolitan area network (LAN/MAN) standards committee, which can be found at www.ieee802.org, as well as standards.ieee.org.

IEEE Standards 802.11 support software and firmware communications services of IEEE 1609, and enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, VANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data.

Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, and/or various others. For example, the controllers may establish bidirectional communications with such internal and external sources, and communicate control commands, logic, and instructions and code, data, information, and signals to and/or from engine 115, EM 120, batteries 130, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, VANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 185, and control or command signals (CS) 190 received from and sent to and between controllers and vehicle components and systems, either over wired and/or wireless data and signaling connections. OS 185, and CS 190, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs), which further refer to, incorporate, and include buttons, and/or switches, and steering wheel controls and buttons (SWCs), instrument cluster and panel hardware and software buttons and switches, and GUI display software switches and controls, among other controls In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth" and Bluetooth low energy (BLE) devices, that enable wireless personal and local area networks (WPANs, WLANs) or "WiFi" IEEE 802.11 and 803.11 communications standards, and/or analog and digital cellular network modems and transceivers (CMTs) 245.

Such CMTs 245 utilize voice/audio and data encoding and technologies that include for example, cellular technologies that are managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services. Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions.

Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100.

For example, the one or more input and output devices include microphones 250, voice processing and recognition devices and subsystems 255, speaker(s) 260, additional display(s) 265, camera(s) 270, nomadic and mobile devices (NMDs) 275, and/or key fobs such as remote and/or keyless car starters and keyless entry devices 275, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs, and may also include, incorporate, and/or be integrated with and/or as part of GUI 200 and the contemplated hardware and software SWCs, controls, buttons, and/or switches. Such HSCs, as already noted, may be hardware or software or combinations thereof and may be configurable utilizing one or more predetermined, default, and adjustable factory and/or driver controls, profiles, and/or preferences of repository 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS, and similar devices and components that each may include integrated transceivers and antennas AT, wired and plugged connectors and data connectors and connections DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections DCs and wired and wireless signals and signaling and data communications and streams WS, with external near and far nomadic, portable, and/or mobile devices 275, networks, and systems (V2X) that may include, for example, roadway and infrastructure communications systems (V2I, I2V) such as hotspots and wireless access points, nano and micro and regular cellular access points and towers, and related and accessible external and remote networks, systems, and servers.

With continuing reference to the various figures, including FIGS. 1, and 2, it may be understood by those with knowledge in the relevant fields of technology that the disclosure contemplates vehicle 100 to include at least one and/or one or more in-vehicle and/or onboard controller(s) such as VSC 140, VCS 145, and others coupled with an in-vehicle or on-board transceiver AT, such as those described in connection with USBs 230, and local, short-range transceivers such as NFCs 235, WRTs 240 (including the contemplated wireless WiFi and Bluetooth and Bluetooth low energy or BLE transceivers), and/or longer-range cellular transceivers such as CMTs 245.

The controller(s) 140, 145 and others, and transceiver(s) AT are configured to detect WSs and to connect to nearby, or proximate, or distant, wired and wireless external, off-board network devices, which are transmitting such WSs that are in-range of transceiver(s) AT. The transceiver(s) AT are also configured to detect and connect to third-party, off-board, external devices such as nomadic, portable, and/or mobile or nomadic mobile devices 275, both internal to and within cabin 155, and external to vehicle 100.

For further example without limitation, many such transceiver(s) and/or antennas AT of vehicle 100 are WiFi and/or Bluetooth and BLE devices, which are configured according to the various standards described elsewhere herein. In one arrangement, for example without limitation and as depicted in FIGS. 1 and 2, such transceivers and antennas AT are configured as WiFi, Bluetooth, and/or BLE configured WRTs 240, and sensors 280, 285 of sensor groups 175 (also denoted generally in the figures, respectively, with the reference letter "B" identifying a Bluetooth and/or BLE configured sensor 285, and with a symbol recognized by some in the field of art as a universal "WiFi" symbol having a dot adjacent to three curved lines) identifying the WiFi configured sensor 280. Additionally, in further variations, the sensors groups 175 further include transceivers and antennas AT and sensors such as CMTs 245, and sensors 290 are configured as cellular signal transceivers and/or sensors 290 (denoted by a reference letter "C" in the figures).

These WRTs 240, CMTs 245, WiFi sensors 280, and/or Bluetooth/BLE sensors 285 (hereafter also referred to collectively herein as "BT" sensors 285), and cellular sensors 290 are configured with effective and/or limited effective ranges (hereafter LERs), which are predetermined distances over which sensors 280, 285, 290 can detect and/or communicate with the various contemplated mobile and nomadic devices NMDs 275, when located with cabin 155 of vehicle 100. Such sensors 280, 285, 290 are configured to be insensitive to and unable to detect and communicate with such mobile and nomadic devices 275 beyond the near field communication range and/or LER, according to the configuration of the sensors groups, sensors, and related components.

Figure 3:
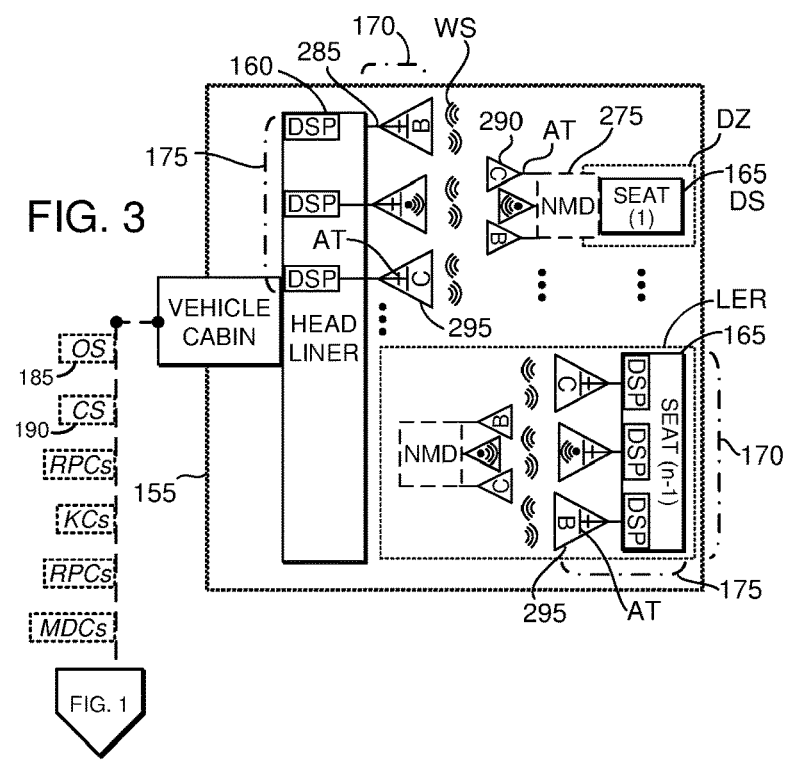
FIG. 3 depicts variations of the configurations of FIGS. 1 and 2, with certain other elements added and removed for purposes of additional example.

An exemplary, schematic depiction of a representative LER is depicted in the various figures, including for example FIGS. 2 and 3, which is also representative of the driver zone DZ that surrounds driver seat DS 165. Although depicted schematically in the figures generally as two dimensional representations, the LERs are intended to represent and define three dimensional volumetric shapes, lobes, and/or envelopes, which may be substantially oblate, obolid, and/or conical in some configurations, and which have a maximum distance distal extent of the LERs, beyond which sensor groups 175 and ATs of sensors 280, 285, 290, are unable to detect electromagnetic emissions from the mobile and/or nomadic devices 275. In one arrangement, the controller(s), sensors 280, 285, 290, DSPs, and related components are tuned to the different frequencies to have a sensitivity to the electromagnetic emissions below a threshold electromagnetic power that prevents detection, reception, and communication with NMDs 275 beyond the LER, which different frequencies include one or more of the already described Bluetooth, BLE, WiFi, and/or cellular frequencies and/or frequency ranges.

For further examples, BLE sensors 285 are configured with a low power BLE configuration that limits communications between sensors 285 and BLE components of NMDs 275 in a near field communication range within about one meter. In other arrangements, controller(s), DSPs, and/or WiFi and cellular sensors 280, 290 are modified with ATs that limit reception of electromagnetic emissions from NMDs 275 that are within a near field communication range of about one meter or so. In other examples, sensor groups 175 and constituent sensors 280, 285, 290, DSPs, ATs, and related components are configured to have limited sensitivity to electromagnetic emissions from NMDs 275 by incorporating one or more and/or at least one antenna construction(s) that include respective directional antennas ATs and/or waveguides 295.

Such directional capabilities and directionally oriented configurations include, for example, implementing such antennas ATs and waveguides 295 to adjust sensitivity and responsiveness to electromagnetic energy in certain preferred directions that establish a predetermined shape and distal extent of LER, as is described elsewhere herein. For example, antennas ATs and waveguides 295 of sensor groups 175 are in one arrangement mounted and/or integrated with headliner 160 to emit and receive such electromagnetic energy from NMDs 275 that are located within the LER, which LER projects downwardly relative to headliner 160 and towards seat positions and seats 165. In other variations, antennas ATs and waveguides 295 of sensor groups 175 are mounted and/or integrated within and/or adjacent to seat positions and seats 165, and directionally oriented to project the LER upwards and/or forwards from a position on the seats 165 and towards NMDs 275 when carried by or located upon or near a driver and passenger that may be seated.

As shown in the figures, waveguides 295 may be for purposes of example but not for purposes of limitation, substantially conically shaped, which configures the volumetric shape of LER to be similarly and substantially lobed and/or conically shaped. However, in other possibly preferred arrangements, cylindrical, slotted masks, emitter/reflector elements, and other types of waveguides 295 may be utilized, according the various principles of antenna design known generally by those skilled in the art.

A number of antenna technologies are suitable and/or modifiable according to the disclosure for utilization as omnidirectional and directionally oriented antennas AT and sensors 280, 285, 290, tuned to the different BLE, WiFi, and cellular frequencies, and LERs described herein, and include for purposes of illustration and example, without limitation, those described in U.S. Pat. Nos. 5,532,709, 5,583,510, 5,777,583, 5,867,131, 5,898,404, 5,898,405, 5,943,017, 5,990,838, 6,005,519, 6,025,811, 6,054,955, and 6,052,096, among others.

Many vendors offer a variety of original equipment manufactured antennas AT, waveguides 295, and DSPs, which can be utilized as available and/or modified according to the disclosure to have omnidirectional and/or directionally oriented configurations that establish the LERs and other capabilities of the disclosure. For example, antennas AT and DSPs that may be utilized and/or modified for purposes of the disclosure includes Vishay DSPs and a Vishay VJ5106W240 series antenna, available from Vishay Intertechnology, Inc., Malvern, Pa., USA. Other exemplary DSPs and antennas include those available from: Texas Instruments, Inc., Dallas, Tex., United States, and include for example the AN-1811 antennas; NXP Semiconductors N.V., Irvine, Calif., United States; Molex, Inc., Lisle, Ill., United States; and DSP Group Inc., Los Altos, Calif., United States, among others.

Waveguides 295 are modified and configured as radio frequency (RF) reflective and/or attenuation devices that are configured to enable specific LERs and corresponding lobe shapes, omnidirectional, and/or directionally oriented configurations, which are associated with each of sensor groups 175, and the incorporated ATs and sensors 240, 245, 280, 285, and/or 290, such that NMDs 275 can only be detected when located within predetermined, specific, respective LERs associated with the respective seat positions 165 (and DZs) and seats 165 (and DSs).

A number of waveguides and related technologies are contemplated for modification with the described antennas AT, and utilization according to the disclosure, and include, for purposes of example without limitation, those described and illustrated in U.S. Pat. Nos. 5,414,394, 5,717,411, 5,764,116, 5,945,894, and 6,044,192, among others. Many such contemplated waveguides 295 are modifiable according to the disclosure to have omnidirectional and/or directionally oriented configurations that also adjust and establish the LERs, and are available from a number of vendors, including for example Fairview Microwave, Inc., Allen, Tex., United States; L3 Narda-ATM, Patchogue, N.Y., United States; and Pasternack Enterprises, Inc., Irvine, Calif., United States, among others.

Each of such sensor groups 175 includes the described and contemplated antennas ATs and waveguides 295, configured as band pass filters, electromagnetically polarizing, electromagnetic energy shields, masks, and/or other constructions that limit, adjust, attenuate, augment, and/or amplify impedance, reception power, and responsiveness of ATs of sensors 240, 245, 280, 285, and/or 290, to electromagnetic frequencies emitted by the contemplated mobile and nomadic devices NMDs 275 when inside cabin 155 and within the LERs of each respective seat position and seat 165.

In further configurations of the disclosure, vehicle 100 includes the controller(s) coupled to DSPs and spaced apart sensor groups 175, which form sensor arrays 170 within cabin 155, and proximate seat positions and seats 165. The sensor groups 175 and constituent components are spaced apart in the arrays, in side to side and front to rear positions in the cabin 155, to include one or more group(s) 175 for each corresponding single seat and seat position 165, to enable DSPs to detect signals, signal strengths, within each LER and to enable generation of the locations of NMDs 275 utilizing any number of distance and triangulation techniques, as is described in various co-owned patents listed elsewhere herein.

Seat positions and seats 165 include the driver zone DZ seat position 165, as well as the driver seat DS 165. Each sensor group 175 includes different frequency tuned antennas AT and at least one waveguide 295, as described elsewhere herein. For example, and with continuing reference to FIGS. 1, 2, and 3, utilizing these configurations, the controller and/or controller(s) are configured to detect the seat position 165 and a keycode KC and/or one or more KCs, of and/or from one or more of the mobile devices and/or NMDs 275, when located in the cabin 155 and are proximate to at least one of the seat positions and seats 165 and within the respective LERs of each seat position and seat 165.

Keycode KC can include one or more authenticate codes, such as a key fob authentication code or other type of code, which may identify the mobile devices and/or NMDs 275 as being paired and/or registered with vehicle 100. For further example, such keycodes may include those described and contemplated in co-owned U.S. Pat. Nos. 8,836,491, 9,349,231, 9,369,830, 9,580,044, and 9,725,071, among others. According to the location of the NMDs 275 within cabin 155, and the keycode KC, the controller(s), such as VSC 140, VCS 145, are further configured to autonomously generate mobile device commands (MDCs) and/or vehicle commands (VCs), responsive to the locations and KCs. For example, when such NMDs 275 are detected to be located in DZ and/or DS 165, the controller(s) may autonomously generate MDCs to lock and/or inactivate one or more functions of the NMDs 275.

In other arrangements, the automatically generated MDCs may temporarily disable email, messaging, and/or other features and capabilities of NMDs 275. The disclosure also contemplates autonomously generating VCs, according to the KCs, and responsive to and when NMDs 275 are detected to be in the DZ and DS 165, to set driver preferences for vehicle 100, which for example may include setting preferences for infotainment system features and capabilities, as well as seat height, and vehicle performance preferences, which settings and preferences may be retrieved from repository 180 and/or additional data that may form a part of such KCs.

Further variations of the disclosure include the controller(s) configured to automatically generate the VCs to enable vehicle 100 to be started, when NMDs 275 are detected in DZ and DS 165, and include KCs that are registered and/or paired with vehicle 100 to enable NMDs 275 to function as the already described key fob. The controller(s) may also autonomously generate VCs to control a maximum speed of vehicle 100, to generate voice or other alerts reminding a driver to avoid using certain features of NMDs 275 during vehicle operation, and/or other VCs. Still other adaptations include the controller(s) configured to detect and generate locations of the NMDs 275 located in seats and positions 165 outside the DZ and DS 165, and to autonomously generate VCs and MDCs to enable capabilities for vehicle 100 and NMDs 275, including for example multimedia streaming (audio, video, data, etc.), extravehicular internet access, and other features and capabilities that may be otherwise unavailable to a driver of vehicle 100 during operation thereof.

Vehicle 100 is also adapted to include sensor groups 175 integrated into headliner 160 and/or seat 165, such that each sensor group 175 is positioned to correspond with respective seat positions and seats 165, including the driver seat DS 165 and driver zone DZ 165. As with other arrangements, the at least one waveguide(s) 295 are configured to establish the substantially limited effective range (LER) to be limited to each respective seat position and/or seat 165, for each of the antennas AT of each sensor group 175. In this configuration, the controller(s), such as controller(s) 140, 145, in combination with the one or more DSPs and each sensor group 175, are configured to generate the locations of each of the one or more mobile devices and NMDs 275 that are proximate to the seats and positions 165, and according to and within the LERs of the antennas AT and sensors 240, 245, 280, 285, and/or 290.

The locations are generated relative to each seat position and seat 165, including driver zone DZ and driver seat DS 165. One or more of the controller(s) and/or DSPs of each sensor group 175, and antennas AT and sensors 240, 245, 280, 285, and/or 290, are configured to detect signals within the LERs, and/or signal strengths, of at least one and/or one or more of the different frequencies of NMDs 275, and to generate the locations of NMDs 275 relative to the seat positions and seats 165. An example of such signal and signal strength detection and location generation utilizing such controller(s), antennas ATs, and sensors 240, 245, 280, 285, and/or 290, includes the technologies and capabilities contemplated and described in co-owned U.S. Pat. Nos. 9,224,289, 9,516,492 and 9,612,797, among others.

As described, the sensor groups 175 are each positioned to correspond to the respective seat positions and seats 165 in cabin 155, such that the at least one and/or one or more waveguides 295 are directionally oriented to establish the LERs to correspond to each respective seat position and seat 165. Consequently, the controller(s), in combination with the DSP(s), generates the location of each mobile device and NMD 275, relative to a single one of the respective seat positions and seats 165, according to the LER.

The disclosure also contemplates each of the described arrangements, modifications, and variations configured with methods of controlling vehicle 100 and operation of the various controller(s), sensor groups 175, sensors 240, 245, 280, 285, and 29, antennas ATs, waveguides 295, and related components and systems, and for autonomously generating the locations of NMDs 275 and MDCs, VCs, and other commands. Such automatic generation of MDCs and VCs is in response to the detected and generated locations of NMDs 275, and the keycode(s) KC(s) detected and/or received from mobile devices and NMDs 275.

In the described and contemplated configurations of vehicle 100, including sensor groups 175 and included components being integrated into headliner 160, and/or seats and seat positions 165, the controller(s), antennas ATs, DSPs, and sensors 240, 245, 280, 285, 290, are cooperatively are configured for generating the respective locations of each of the mobile devices/NMDs 275, relative to each corresponding single seat 165 of the seat positions 165, as a function of and according to the directional orientation of antennas ATs and waveguides 295 and the correspondingly established LERs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a controller coupled to in-cabin sensor groups each specific to a different seating position and including antennas each tuned to a different mobile device communication protocol frequency, the controller configured to detect a mobile device communication using one of the sensor groups, and generate mobile device and vehicle commands based on the seating position specific to the one sensor group and a keycode received from the mobile device, detect the mobile device communication using one of second sensor groups, the second sensor groups each being specific to the seating position of a different one of the sensor groups and including antennas each tuned to a different mobile device communication frequency, the one second sensor group being specific to the seating position that is specific to the one sensor group used to detect the mobile device communication, detect the mobile device communication using one of the second sensor groups, the one second sensor group being specific to the seating position that is specific to the one sensor group used to detect the mobile device communication, identify the mobile device as being located in the seating position specific to the one sensor group and the one second sensor group based on the communication detected using the one sensor group and the one second sensor group, and generate the mobile device and vehicle commands based on identifying the mobile device as being in the seating position specific to the one sensor group and the one second sensor group.

2. The vehicle according to claim 1, wherein each sensor group comprises at least one waveguide configured to establish an effective range for the sensor group substantially limited to the seating position for the sensor group.

3. The vehicle according to claim 2, wherein each sensor group is integrated into a headliner of the cabin above the seating position for the sensor group, and the at least one waveguide of each sensor group has a directional orientation configured to project the effective range of the sensor group downward towards the seating position specific to the sensor group.

4. The vehicle according to claim 2, wherein each sensor group is integrated as part of a seat of the seating position specific to the sensor group, and the at least one waveguide of each sensor group has a directional orientation configured to project the effective range of the sensor group upwards from the seat of the seating position specific to the sensor group.

5. The vehicle according to claim 1, wherein each antenna of each sensor group is coupled to a different digital signal processor tuned to the different mobile device communication protocol frequency of the antenna.

6. The vehicle according to claim 5, wherein the antennas of each sensor group each comprises a waveguide tuned to the mobile device communication protocol frequency to which the antenna is tuned, the antennas and waveguides of each sensor group are integrated into a headliner of the cabin above the seating position specific to the sensor group, and the waveguides of each sensor group are configured to establish and project downwards an effective range for the sensor group substantially limited to the seating position for the sensor group.

7. The vehicle according to claim 5, wherein the antennas of each sensor group each comprises a waveguide tuned to the mobile device communication protocol frequency to which the antenna is tuned, the antennas and waveguides of each sensor group are integrated as part of a seat of the seating position specific to the sensor group, and the waveguides of each sensor group are configured to establish and project upwards an effective range for the sensor group substantially limited the seating position for the sensor group.

8. A system comprising:

sensor groups each associated with a different vehicle seating position and each including antennas each tuned to a different mobile device communication protocol frequency; second sensor groups each being specific to the seating position of a different one of the sensor groups and including antennas each tuned to a different mobile device communication frequency; and a controller coupled to the sensor groups and configured to detect a mobile device communication using one of the sensor groups, generate a vehicle and/or mobile device command based on the seating position associated with the one sensor group and a the keycode received from the mobile device, detect the mobile device communication using one of the second sensor groups, the one second sensor group being specific to the seating position that is specific to the one sensor group used to detect the mobile device communication, identify the mobile device as being located in the seating position specific to the one sensor group and the one second sensor group based on the communication detected using the one sensor group and the one second sensor group, and generate the mobile device and vehicle commands based on identifying the mobile device as being in the seating position specific to the one sensor group and the one second sensor group.

9. The system according to claim 8, wherein each sensor group includes a waveguide for each antenna of the sensor group, the waveguide being tuned to the frequency of the antenna and being configured to establish an effective range for the sensor group that is substantially limited to the seating position for the sensor group.

10. The system according to claim 8, wherein each antenna of each sensor group is coupled to a different signal processor tuned to the frequency of the antenna.

11. The system according to claim 9, wherein the antennas and waveguides of each sensor group are integrated into a headliner of a vehicle cabin above the seating position for the sensor group, the waveguides and antennas having a directional orientation configured to project the effective range of the sensor group downwards towards the seating position for the sensor group.

12. The system according to claim 9, wherein the antennas and waveguides of each sensor group are integrated as part of a single seat of the seating position for the sensor group, the waveguides and antennas having a directional orientation configured to project the effective range of the sensor group upwards.

13. A method comprising:

by a vehicle controller coupled to in-cabin sensor groups each being specific to a different seating position of the vehicle and including antennas each tuned to a different mobile device communication protocol frequency detecting a mobile device communication using one of the sensor groups; generating vehicle and mobile device commands based on the seating position specific to the one sensor group and a keycode received from the mobile device; detecting the mobile device communication using one of second sensor groups, the second sensor groups each being specific to the seating position of a different one of the sensor groups and including antennas each tuned to a different mobile device communication frequency, the one second sensor group being specific to the seating position that is specific to the one sensor group used to detect the mobile device communication; identifying the mobile device as being located in the seating position specific to the one sensor group and the one second sensor group based on the communication detected using the one sensor group and the one second sensor group; and generating the mobile device and vehicle commands based on identifying the mobile device as being in the seating position specific to the one sensor group and the one second sensor group.

14. The method according to claim 13, wherein the antennas and waveguides of each sensor group are integrated into a headliner of the cabin above the seating position specific to the sensor group and have a directional orientation configured to project the effective range of the sensor group downwards towards the seating position for the sensor group.

15. The method according to claim 13, wherein each antenna of each sensor group is coupled to a different signal processor tuned to the frequency of the antenna.

16. The method according to claim 13, wherein each sensor group includes a waveguide for each antenna of the sensor group that is configured to establish an effective range for the sensor group substantially limited to the seating position specific to the sensor group.

17. The method according to claim 16, wherein the antennas and waveguides of each sensor group are integrated as part of a single seat of the seating position for the sensor group and have a directional orientation configured to project the effective range of the sensor group upwards.

18. The vehicle of claim 1, wherein a first one of the antennas of each sensor group is tuned to a cellular frequency, and a second one of the antennas of each sensor group is tuned to a bluetooth frequency.

19. The vehicle of claim 1, wherein the seating position specific to the one sensor group is a driver seating position, and the controller is configured to, responsive to determining that the keycode is registered with the vehicle, enable the vehicle to be started and apply vehicle preferences associated with the keycode.

* * * * *